Patented Dec. 5, 1950

2,533,002

UNITED STATES PATENT OFFICE 2,533,002

1-METHYL -3- PIPERIDYLMETHYL PHENYL-(2-THIENYL) ACETATE, ITS SALTS AND PRODUCTION THEREOF

Rolland F. Feldkamp, Troy, N. Y., assignor to Sterling Drug Inc., New York, N. Y., a corporation of Delaware No Drawing. Application October 29, 1949, Serial No. 124,489

5 Claims. (Cl. 260—294.3)

This invention relates to a new basic ester, 1-methyl-3-piperidylmethyl phenyl-(2-thienyl)-acetate having the formula

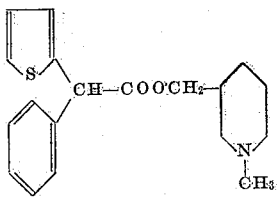

and to acid-addition and quaternary ammonium salts thereof. This invention also relates to a process for preparing said basic ester.

My new compound, 1-methyl-3-piperidylmethyl phenyl-(2-thienyl)acetate, has marked antispasmodic activity when tested in the form of a water-soluble salt.

1 - methyl - 3 - piperidylmethyl phenyl-(2-thienyl)acetate can be prepared by esterification of the corresponding alcohol, 1-methyl-3-piperidylmethanol, with phenyl-(2-thienyl)acetic acid. The reaction of phenyl-(2-thienyl)acetyl chloride with 1-methyl-3-piperidylmethanol was found impractical because the acid chloride could not conveniently be prepared due to side reactions of the acid with acid chloride-forming reagents. A satisfactory alternative was found whereby 1-methyl-3-piperidylmethanol is heated with the free acid, phenyl-(2-thienyl)acetic acid, in a water-immiscible inert solvent of boiling point 60–140° C., preferably in the presence of an acid catalyst, with means for removing the water formed in the reaction. A convenient method of carrying out this procedure comprises prolonged heating of the alcohol with the acid in benzene solution in the presence of gaseous hydrogen chloride using a water separator to remove the water from the refluxing vapors and thus shift the equilibrium in the direction of the desired ester. The volume of water formed also serves to indicate the extent of the reaction.

Benzene is the preferred solvent, but other water-immiscible solvents such as toluene and xylene can be used. The acid catalyst can be a gas such as hydrogen chloride or hydrogen bromide, in which case it is bubbled through the mixture in comparatively large quantities. If the acid catalyst is liquid or solid such as concentrated sulfuric acid, benzenesulfonic acid, p-toluenesulfonic acid, etc., it can be added in quantity slightly in excess of that necessary to neutralize the 1-methyl-3-piperidylmethanol; the corresponding acid-addition salt of 1-methylpiperidyl-methyl phenyl-(2-thienyl)acetate is then formed.

If gaseous hydrogen chloride or hydrogen bromide is used as the acid catalyst the hydrochloride or hydrobromide respectively of 1-methyl-3-piperidylmethyl phenyl - (2 - thienyl)acetate is formed directly. The free basic ester itself may be obtained by addition of an alkaline reagent to these salts. Other suitable acid-addition salts may be obtained by reaction of the free basic ester with an acid, preferably in an inert solvent such as benzene or ether. For example, nitric acid, sulfuric acid, hydriodic acid, tartaric acid, acetic acid, citric acid, lactic acid, benzenesulfonic acid and p-toluenesulfonic acid give respectively the nitrate, sulfate, hydroiodide, tartrate (or bitartrate), acetate, citrate, lactate, benzenesulfonate, and p-toluenesulfonate.

The quaternary ammonium salts are formed by admixture of the basic ester with alkyl or aralkyl esters of strong inorganic or organic acids usually in an inert organic solvent such as ether, benzene or ethyl acetate. The reaction occurs merely by allowing the mixture to stand for a day or two, but it may be accelerated by gentle heating. For example, methyl chloride, methyl bromide, methyl iodide, ethyl bromide, propyl bromide, benzyl chloride, methyl sulfate and methyl benzenesulfonate give respectively the methochloride, methobromide, methiodide, ethobromide, propobromide, benzochloride, methosulfate and metho-benzenesulfonate.

The following example will illustrate my invention more fully.

Example (a) 1 - methyl - 3 - piperidylmethyl phenyl-(2-thienyl)acetate hydrochloride.—A mixture of 139 g. (0.637 mole) of phenyl-(2-thienyl)acetic acid, 82.2 g. (0.637 mole) of 1-methyl-3-piperidylmethanol and 500 cc. of benzene was placed in a 2 liter flask fitted with a water separator, condenser, submerged gas inlet tube and a calcium chloride drying tube. Sufficient heat was applied to maintain a slow refluxing rate while a slow stream of hydrogen chloride gas was introduced from a generator. After 218 hours, 7.8 cc. of water (68% of theory) had separated. The reaction mixture was transferred to a beaker, and the solvent was evaporated on a hot plate with the aid of an air jet. The residual slurry was completely solidified by washing with several fresh portions of anhydrous ether. The solid was collected on a Büchner funnel and air dried. This crude ester hydrochloride was recrystallized twice from isopropyl alcohol giving 100 g., M. P. 172–174° C. (42.7%).

The combined ether washings and mother liquors were combined and concentrated by distillation to a syrupy residue. Several fresh portions of benzene were added and distilled to remove residual traces of isopropyl alcohol. The final residue was treated with 250 cc. of benzene and the above described esterification procedure repeated for 120 hours. An additional 3.7 cc. of water (32% of theory) separated in this period. A work up as above gave 58.9 g. of product, M. P. 172–174° C. (25.6%). The total yield was 158.9 g. of 1-methyl-3-piperidylmethyl phenyl-(2-thienyl)acetate hydrochloride; M. P. 173.9–175.4° C. (corr.) (68.3%).

*Anal.*—Calcd. for $C_{19}H_{23}NO_2S \cdot HCl$: Cl, 9.7; S, 8.74. Found: Cl, 9.43; S, 8.98.

Other esterifications by this method have indicated that the rate of esterification varies directly with the rate of hydrogen chloride introduction and in several experiments the reaction was complete within 15 hours.

(b) *1-methyl-3-piperidylmethyl phenyl-(2-thienyl)acetate methiodide.*—The hydrochloride (8.5 g.) from part (a) was dissolved in water and treated with 10% sodium carbonate solution until basic. The liberated basic ester was extracted with ether, the ether solution was dried over anhydrous magnesium sulfate, filtered, and treated with 28.4 g. of methyl iodide. A precipitate immediately formed which after filtration and recrystallization from ethanol and then from acetone gave 5.3 g. of 1-methyl-3-piperidylmethyl phenyl-(2-thienyl)acetate methiodide, M. P. 153.5–155° C.

*Anal.*—Calcd. for $C_{20}H_{26}INO_2S$: C, 51.4; H, 5.34; I, 26.9. Found: C, 51.26; H, 5.45; I, 26.63.

This application is a continuation-in-part of my copending application Ser. No. 122,366, filed October 19, 1949.

I claim:

1. A compound selected from the group consisting of 1-methyl-3-piperidylmethyl phenyl-(2-thienyl)acetate having the formula

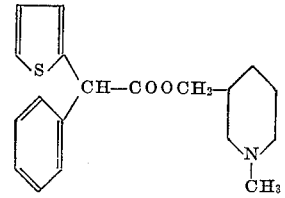

and acid addition and quaternary ammonium salts thereof.

2. 1-methyl-3-piperidylmethyl phenyl-(2-thienyl)acetate hydrochloride.

3. 1-methyl-3-piperidylmethyl phenyl-(2-thienyl)acetate methiodide.

4. The process for preparing an acid addition salt of 1-methyl-3-piperidylmethyl phenyl-(2-thienyl)acetate which comprises heating 1-methyl-3-piperidylmethanol with phenyl-(2-thienyl)-acetic acid in a water-immiscible inert solvent of boiling point 60–140° C. in the presence of an acid catalyst, while removing the water as formed from the solvent vapors.

5. The process for preparing 1-methyl-3-piperidylmethyl phenyl-(2-thienyl)acetate hydrochloride which comprises heating 1-methyl-3-piperidylmethanol with phenyl-(2-thienyl)acetic acid in benzene solution in the presence of hydrogen chloride gas, while removing the water as formed from the benzene vapors.

ROLLAND F. FELDKAMP.

No references cited.